US012812671B2

(12) United States Patent
Yonemoto

(10) Patent No.: US 12,812,671 B2
(45) Date of Patent: Nov. 24, 2026

(54) WIRELESS COMMUNICATION SYSTEM THAT COMMUNICATES USING TIME SLOTS

(71) Applicant: JVCKENWOOD Corporation, Yokohama (JP)

(72) Inventor: Kei Yonemoto, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 257 days.

(21) Appl. No.: 18/820,360

(22) Filed: Aug. 30, 2024

(65) Prior Publication Data

US 2024/0422817 A1 Dec. 19, 2024

Related U.S. Application Data

(63) Continuation of application No. PCT/JP2023/004377, filed on Feb. 9, 2023.

(30) Foreign Application Priority Data

Mar. 3, 2022 (JP) ................................ 2022-032584

(51) Int. Cl.
*H04W 74/08* (2024.01)

(52) U.S. Cl.
CPC .................................. *H04W 74/08* (2013.01)

(58) Field of Classification Search
CPC . H04W 74/08; H04W 74/0808; H04W 16/26; H04B 7/155; H04B 7/15542
See application file for complete search history.

(56) References Cited

U.S. PATENT DOCUMENTS

2016/0197667 A1* 7/2016 Ohta .................. H04B 7/15507 370/315

FOREIGN PATENT DOCUMENTS

JP H09298521 A 11/1997

OTHER PUBLICATIONS

International Preliminary Examination Report on Patentability from International Application No. PCT/JP2023/004377 mailed Aug. 30, 2024, 4 pages.
International Search Report from International Application No. PCT/JP2023/004377 malied Apr. 11, 2023, 4 pages.

* cited by examiner

*Primary Examiner* — Abdullah A Riyami
(74) *Attorney, Agent, or Firm* — Shih IP Law Group, PLLC

(57) ABSTRACT

Upon receiving a transmission start request from a first mobile station when a host relay station is suspending transmission, a first subordinate relay station transmits the transmission start request to the host relay station via a network. Upon receiving the transmission start request, the host relay station transmits an idle frame indicating that slots other than one slot are in use. Upon receiving a signal from the first mobile station in the one slot, the first subordinate relay station transmits the signal to the host relay station via the network. The host relay station receives the signal from the first subordinate relay station and uses the one slot for the first mobile station.

2 Claims, 14 Drawing Sheets

FIG. 6

| IDLE FRAME | SLOT INFORMATION | |
|---|---|---|
| | SLOT A | SLOT B |
| STATUS | UNUSED | UNUSED |

FIG. 9

| VOICE OR DATA FRAME | SLOT INFORMATION | |
|---|---|---|
| | SLOT A | SLOT B |
| STATUS | Voice or Data | UNUSED |

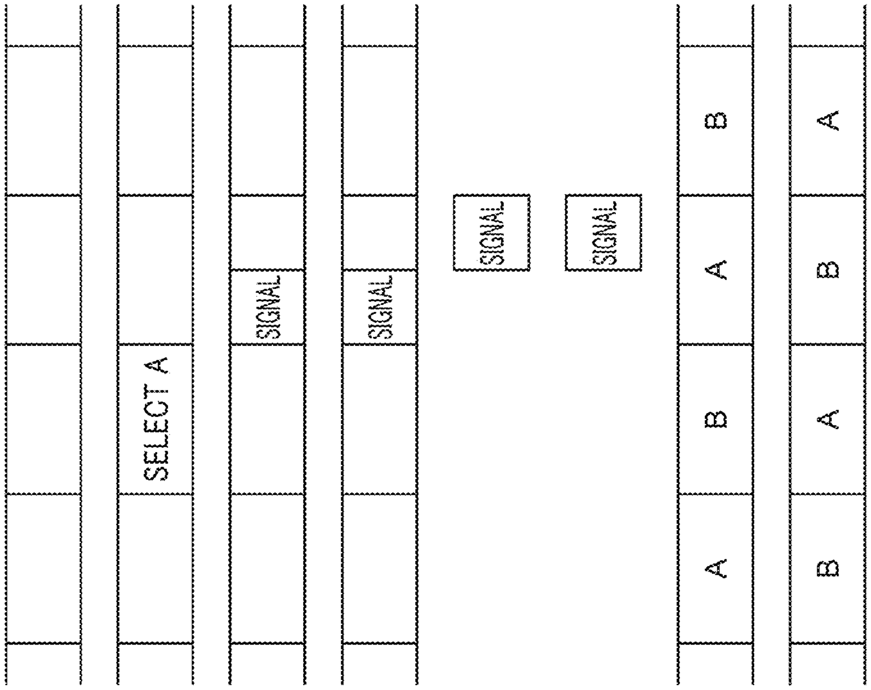
FIG. 10A HOST RELAY STATION TRANSMISSION
FIG. 10B MOBILE STATION RECEPTION
FIG. 10C MOBILE STATION TRANSMISSION
FIG. 10D SUBORDINATE RELAY STATION RECEPTION
FIG. 10E SUBORDINATE RELAY STATION TRANSMISSION
FIG. 10F HOST RELAY STATION RECEPTION
FIG. 10G UPLINK TIME SLOT
FIG. 10H DOWNLINK TIME SLOT

FIG. 12

| IDLE FRAME | SLOT INFORMATION | |
| --- | --- | --- |
| | SLOT A | SLOT B |
| STATUS | UNUSED | IN USE |

FIG. 13A UPLINK TIME SLOT

FIG. 13B DOWNLINK TIME SLOT

FIG. 13C HOST RELAY STATION TRANSMISSION

FIG. 13D MOBILE STATION RECEPTION

FIG. 13E MOBILE STATION TRANSMISSION

FIG. 13F SUBORDINATE RELAY STATION RECEPTION

FIG. 13G SUBORDINATE RELAY STATION TRANSMISSION

FIG. 13H HOST RELAY STATION RECEPTION

WIRELESS COMMUNICATION SYSTEM THAT COMMUNICATES USING TIME SLOTS

CROSS-REFERENCE TO RELATED APPLICATION

This application is based upon and claims the benefit of priority from the prior Japanese Patent Application No. 2022-032584, filed on Mar. 3, 2022, the entire contents of which is incorporated herein by reference.

BACKGROUND

1. Technical Field

The present disclosure relates to communication technology and particularly to a wireless communication system that communicates using time slots.

2. Description of the Related Art

In a wireless communication system using time division multiple access (TDMA), a relay station is arranged between a host station and a subordinate station. The host station generates usage status information for each time slot of a TDMA signal and transmits the usage status information to each relay station. Each relay station determines whether the time slot of the TDMA signal to be relayed is unused or in use based on the received usage status information, and if the time slot is unused, permits relay transmission in the time slot (for example, Patent Document 1).

[Patent Document 1] Japanese Patent Application Publication No. H9-298521

When a host relay station and a subordinate relay station are included as relay stations while the host relay station and the subordinate relay station are connected by a wired network, unstable network delay may occur in the wired network. Network delay may lead to inaccurate allocation of time slots to mobile stations.

SUMMARY

A wireless communication system according to an embodiment includes: a host relay station that is capable of specifying a plurality of downlink time slots time-division multiplexed at a downlink frequency, specifying a plurality of uplink time slots time-division multiplexed at an uplink frequency different from the downlink frequency, transmitting a signal at the downlink frequency, and receiving a signal at the uplink frequency; and a subordinate relay station that is connected to the host relay station via a network and is capable of receiving a signal at the uplink frequency but is not capable of transmitting a signal at the downlink frequency. The host relay station suspends transmission of a signal when there is no signal reception. Upon receiving a transmission start request at the uplink frequency from a mobile station that wishes to start communication when the transmission is being suspended by the host relay station, the subordinate relay station transmits the transmission start request to the host relay station via the network. Upon receiving the transmission start request from the subordinate relay station, the host relay station transmits an idle frame at the downlink frequency that indicates that downlink time slots other than a first downlink time slot are in use out of the plurality of downlink time slots and that uplink time slots other than a first uplink time slot are in use out of the plurality of uplink time slots. Upon receiving a signal from the mobile station in the first uplink time slot at the uplink frequency, the subordinate relay station transmits the signal to the host relay station via the network. The host relay station receives the signal from the subordinate relay station. The host relay station uses the first downlink time slot and the first uplink time slot for the mobile station.

Optional combinations of the aforementioned constituting elements and implementations of the present embodiments in the form of methods, apparatuses, systems, recording mediums, and computer programs may also be practiced as additional modes of the present embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is a diagram showing a data structure of slot information included in an idle frame obtained thus far;

FIG. 9 is a diagram showing a data structure of slot information included in an audio or data frame;

FIGS. 10A to 10H are diagrams showing an overview of another communication when the idle frame of FIG. 6 is used;

FIG. 12 is a diagram showing a data structure of slot information included in an idle frame according to the present exemplary embodiment;

DETAILED DESCRIPTION

The invention will now be described by reference to the preferred embodiments. This does not intend to limit the scope of the present invention, but to exemplify the invention.

A brief description of the present disclosure will be given first before a specific description thereof is given. Exemplary embodiments of the present disclosure relate to a wireless communication system including relay stations and mobile stations. The relay stations may be classified into a host relay station and a subordinate relay station. The digital mobile radio (DMR) standard, which is a TDMA-based wireless communication protocol defined by the European Telecommunication Authority (ETSI), is used for the wireless communication system. The ETSI DMR Tier 2 standard is widely used in conventional systems that meet FB6, which is a station class defined by the federal correspondent commission (FCC). An explanation will be given in the following in the order of: (1) basic configuration; (2) connection process thus far; and (3) connection process in the exemplary embodiment.

(1) Basic Configuration

Figure 1:
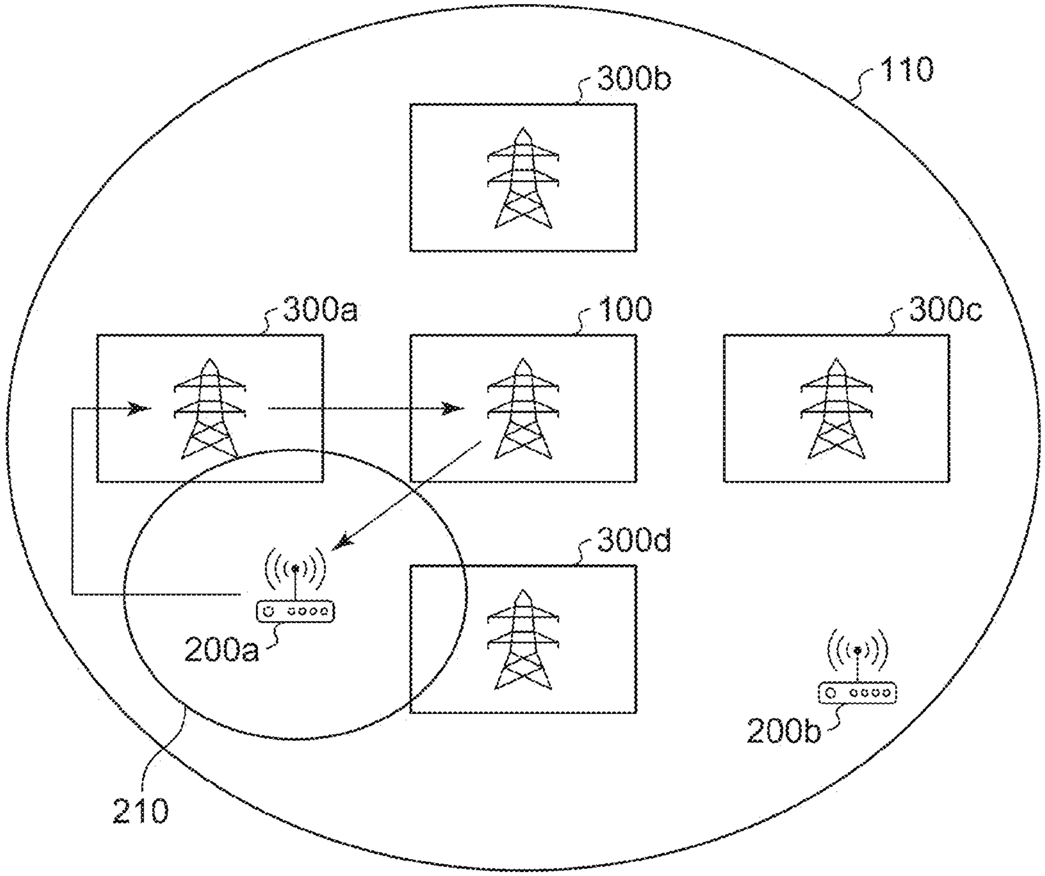
FIG. 1 is a diagram showing the configuration of a wireless communication system according to an exemplary embodiment.

FIG. 1 shows the configuration of a wireless communication system 1000. The wireless communication system 1000 includes: a host relay station 100; a first mobile station 200*a* and a second mobile station 200*b*, which are generically referred to as mobile stations 200; and a first subordinate relay station 300*a* and a fourth subordinate relay station 300*d*, which are generically referred to as subordinate relay stations 300. The number of mobile stations 200 included in the wireless communication system 1000 is not limited to "2," and the number of subordinate relay stations 300 is not limited to "4." The wireless communication system 1000 complies, for example, with the DMR standard.

In the wireless communication system 1000, a downlink used for transmission from the host relay station 100 and an uplink used for reception at the host relay station 100 are specified. Further, the frequency of the downlink (hereinafter referred to as "downlink frequency") and the frequency of the uplink (hereinafter referred to as "uplink frequency") are different. Further, a plurality of downlink time slots time-division multiplexed at the downlink frequency are specified, and a plurality of uplink time slots time-division multiplexed at the uplink frequency are specified. The downlink and uplink time slots are collectively referred to as "time slots" or "slots."

Figures 2A, 2B:
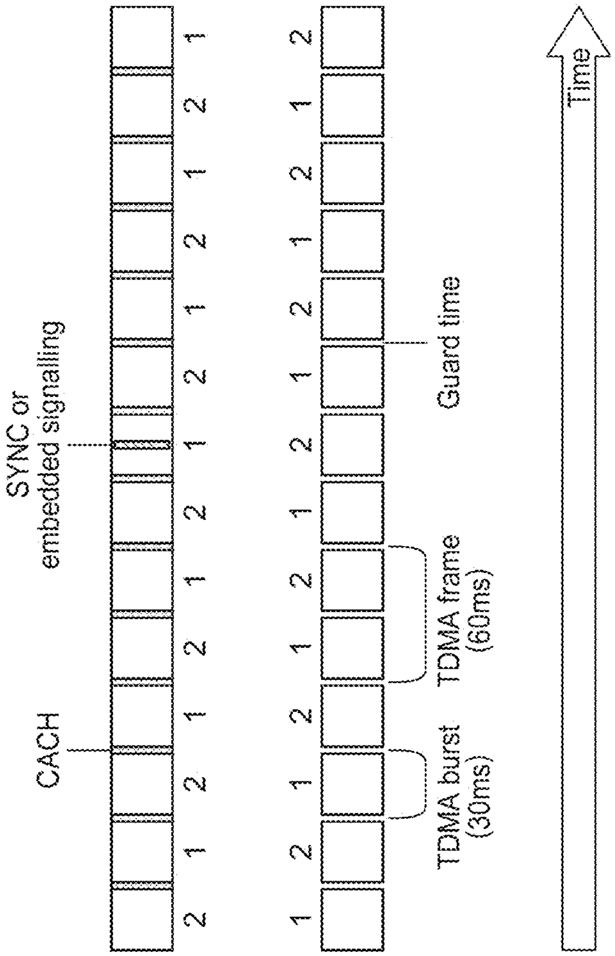
FIGS. 2A to 2B are diagrams showing a configuration of time slots specified in the wireless communication system according to FIG. 1.

FIGS. 2A to 2B show a configuration of time slots specified in the wireless communication system 1000. FIG. 2A shows downlink time slots. First downlink time slots indicated by "1" and second downlink time slots indicated by "2" are repeated. FIG. 2B shows uplink time slots. First uplink time slots indicated by "1" and second uplink time slots indicated by "2" are repeated. Further, the first downlink time slots and the first uplink time slots are different in timing, and the second downlink time slots and the second uplink time slots are also different in timing. In the following explanation, the first downlink time slots or the first uplink time slots are sometimes referred to as "slots A," and the second downlink time slots or the second uplink time slots are sometimes referred to as "slots B." The description now returns to FIG. 1.

Figure 3:
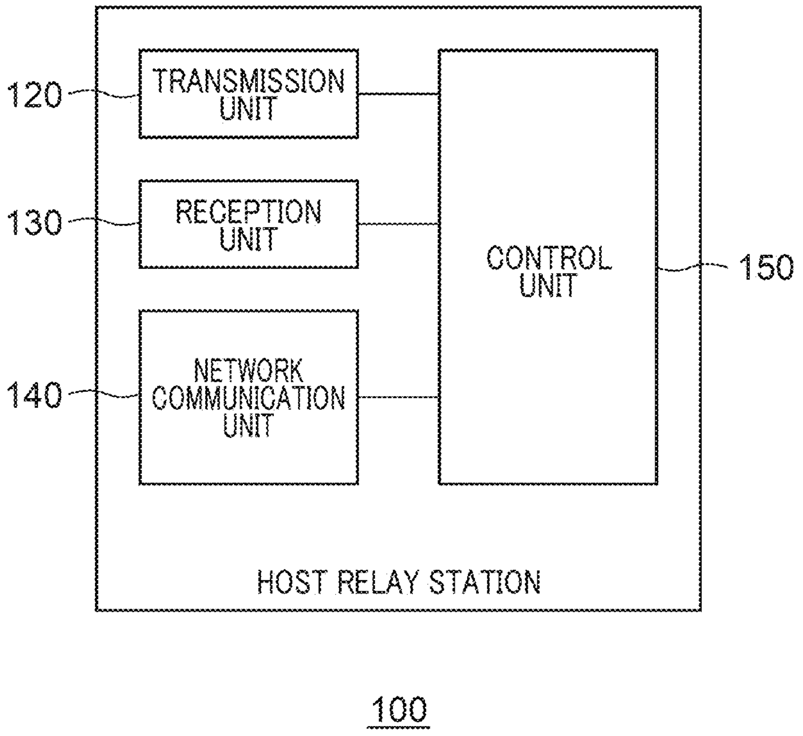
FIG. 3 is a diagram showing a configuration of a host relay station of FIG. 1.

The host relay station 100 is a wireless device that relays signals (audio frames and data frames) among a plurality of mobile stations 200. FIG. 3 shows the configuration of the host relay station 100. The host relay station 100 includes a transmission unit 120, a reception unit 130, a network communication unit 140, and a control unit 150. The transmission unit 120 can transmit signals at the downlink frequency, and the reception unit 130 can receive signals at the uplink frequency. An area in which signals transmitted from the transmission unit 120 can be received is shown as a host relay station transmission coverage 110 in FIG. 1. The network communication unit 140 can communicate with a plurality of subordinate relay stations 300 by a wired network. The control unit 150 controls the operation of the entire host relay station 100. The description now returns to FIG. 1.

Figure 4:
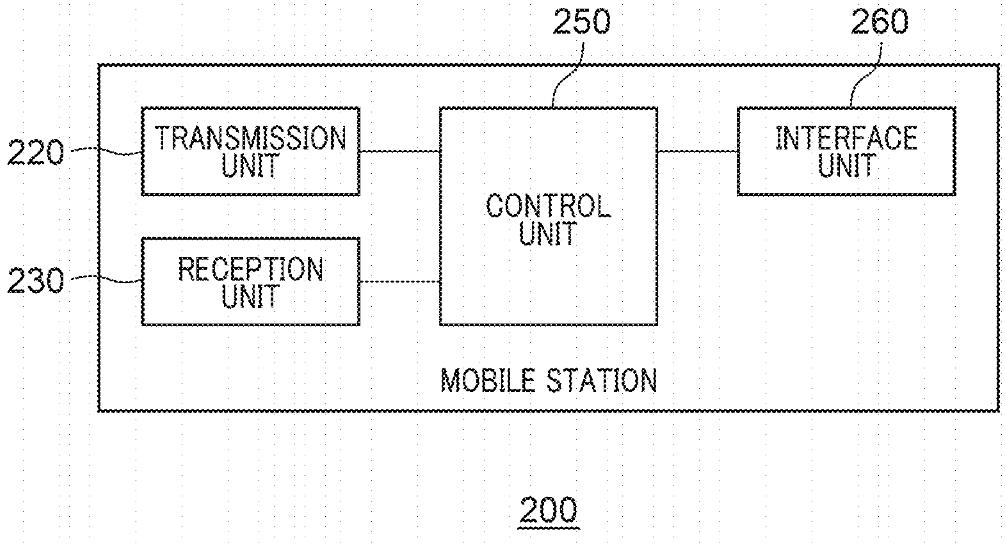
FIG. 4 is a diagram showing a configuration of a mobile station of FIG. 1.

The mobile stations 200 are wireless devices that are carried by users and can perform audio communication or data communication. For example, a signal transmitted from the first mobile station 200*a* for audio communication or data communication is received by the host relay station 100 and then transmitted from the host relay station 100 to the second mobile station 200*b*. FIG. 4 shows the configuration of a mobile station 200. The mobile station 200 includes a transmission unit 220, a reception unit 230, a control unit 250, and an interface unit 260. The transmission unit 220 can transmit signals at the uplink frequency, and the reception unit 230 can receive signals at the downlink frequency. An area in which signals transmitted from the transmission unit 220 can be received is shown as a mobile station transmission coverage 210 in FIG. 1. The control unit 250 controls the operation of the entire mobile station 200. The interface unit 260 is an interface with a user using the mobile station 200, and includes, for example, an operation unit such as a push to talk (PTT) button, a microphone, a speaker, and a display. The description now returns to FIG. 1.

The mobile station transmission coverage 210 is smaller than the host relay station transmission coverage 110. Therefore, although the mobile station 200 is included in the host relay station transmission coverage 110 depending on a position where the mobile station 200 exists, a situation may occur in which the host relay station 100 is not included in the mobile station transmission coverage 210. This can be considered to be a situation where although downlink communication is performed, upstream line communication is not performed. In order to suppress the occurrence of such a situation, a plurality of subordinate relay stations 300 are installed in the host relay station transmission coverage 110.

Figure 5:
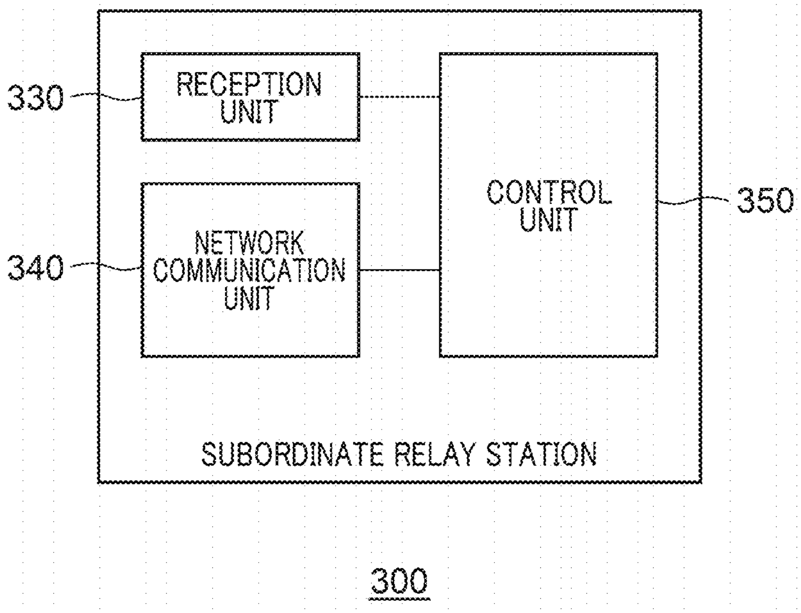
FIG. 5 is a diagram showing a configuration of a subordinate relay station of FIG. 1.

FIG. 5 shows the configuration of the subordinate relay station 300. The subordinate relay station 300 includes a reception unit 330, a network communication unit 340, and a control unit 350. The reception unit 330 can receive signals at the uplink frequency. On the other hand, since the subordinate relay station 300 does not include a transmission unit, the subordinate relay station 300 cannot transmit signals at the downlink frequency. The network communication unit 340 can communicate with the host relay station 100 by a wired network. Thus, each of the plurality of subordinate relay stations 300 and the host relay station 100 are connected by a wired network, for example, an internet protocol (IP) network. The description now returns to FIG. 1. A signal transmitted from a mobile station 200 in the mobile station transmission coverage 210 that does not include the host relay station 100, for example, the first mobile station 200*a* is received by the first subordinate relay station 300*a* and transmitted from the first subordinate relay station 300*a* to the host relay station 100.

(2) Connection Process Thus Far

(2-1) Process Between Host Relay Station 100 and Mobile Station 200

In a conventional system, the host relay station 100 is obliged to suspend signal transmission when there is no signal received from the mobile station 200. When signal transmission is being suspended by the host relay station 100, the mobile station 200 that wishes to start communication, which is the first mobile station 200*a*, transmits a transmission start request at the uplink frequency. For clarity of explanation, it is assumed that the host relay station 100 is included in the mobile station transmission coverage 210 of the first mobile station 200*a* unlike FIG. 1.

The reception unit 130 of the host relay station 100 receives the transmission start request at the uplink frequency. Upon receiving the transmission start request, the control unit 150 generates an idle frame including information on the currently available slot (hereinafter referred to as "slot information"), and the transmission unit 120 transmits the idle frame at the downlink frequency. FIG. 6 shows a data structure of slot information included in an idle frame obtained thus far. The slot information indicates that slots A and B are unused. The slot A corresponds to the combination of the first downlink time slot and the first uplink time slot described above, and the slot B corresponds to the combination of the second downlink time slot and the second upstream time slot described above. In this state, although the control unit 150 specifies the two slots, the control unit 150 has not determined which one is the slot A or the slot B. The description now returns to FIG. 1.

The reception unit 230 of the first mobile station 200*a* receives the idle frame. Since the relative timing of the idle frame is known, the control unit 250 establishes synchronization with the host relay station 100 based on the point in time of the reception of the idle frame. Publicly-known techniques need to be used for the establishment of the synchronization, and the explanation thereof is thus omitted. Further, by establishing the synchronization, the downlink and uplink time slots shown in FIGS. 2A to 2B are formed in the first mobile station 200*a*. The control unit 250 extracts slot information from the idle frame. Upon confirming that both of the slot A and the slot B can be used according to the slot information, the control unit 250 selects any one of the slots, for example, a slot A. The control unit 250 includes the selected slot number in a signal to be transmitted, for example, an audio frame. The transmission unit 220 transmits the audio frame to the host relay station 100 in the slot A, that is, the first uplink time slot. The signal to be transmitted is not limited to an audio frame and may be a data frame.

The reception unit 130 of the host relay station 100 receives an audio frame from the first mobile station 200*a* in the first uplink time slot at the uplink frequency. The control unit 150 permits the first mobile station 200*a* to use the slot A based on the slot number included in the audio frame. Further, the control unit 150 determines the uplink time slot in which the audio frame has been received to be the first uplink time slot. As a result, the control unit 150 uses the first uplink time slot and the first downlink time slot, that is, the slot A, for the first mobile station 200*a*.

Figures 7A, 7B, 7C, 7D, 7E, 7F:
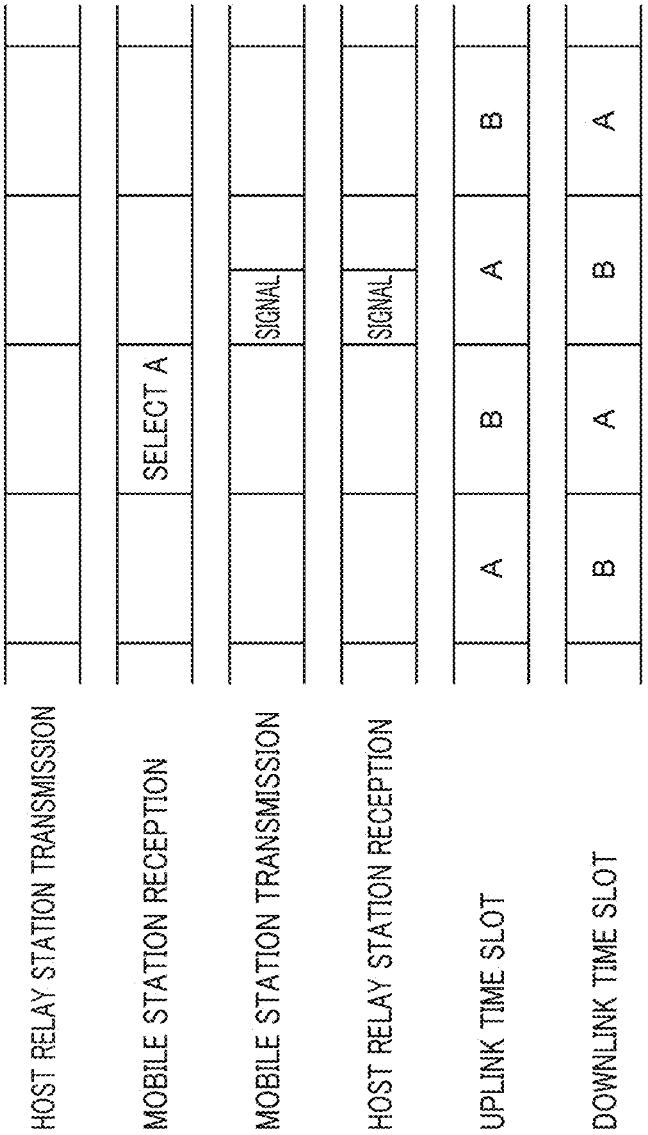
FIGS. 7A to 7F are diagrams showing an overview of communication when the idle frame of FIG. 6 is used.

FIGS. 7A to 7F show an overview of communication when the idle frame of FIG. 6 is used. FIG. 7A shows a signal transmitted from the host relay station 100. Since transmission is being suspended, no signal is transmitted from the host relay station 100, and only downlink time slots are specified. FIG. 7B shows a signal received at the first mobile station 200*a*. The first mobile station 200*a* selects one downlink time slot as the slot A. FIG. 7C shows a signal transmitted from the first mobile station 200*a*. The first mobile station 200*a* transmits a signal at the first uplink time slot corresponding to the selected slot A. FIG. 7D shows a signal received by the host relay station 100. The host relay station 100 receives a signal from the first mobile station 200*a*.

FIG. 7E shows an uplink time slot determined by the host relay station 100. Since the slot number included in the signal from the first mobile station 200*a* includes the slot A, the uplink time slot in which the signal has been received is determined to be the first uplink time slot. The first uplink time slot is shown as "slot A" here. Further, the host relay station 100 arranges the first uplink time slot and the second uplink time slot alternately based on the determined first uplink time slot. FIG. 7F shows a downlink time slot determined by the host relay station 100. The host relay station 100 determines a downlink time slot with the same point in time as the first uplink time slot to be the second downlink time slot. The host relay station 100 determines a downlink time slot with the same point in time as the second uplink time slot to be the first downlink time slot.

Figure 8:
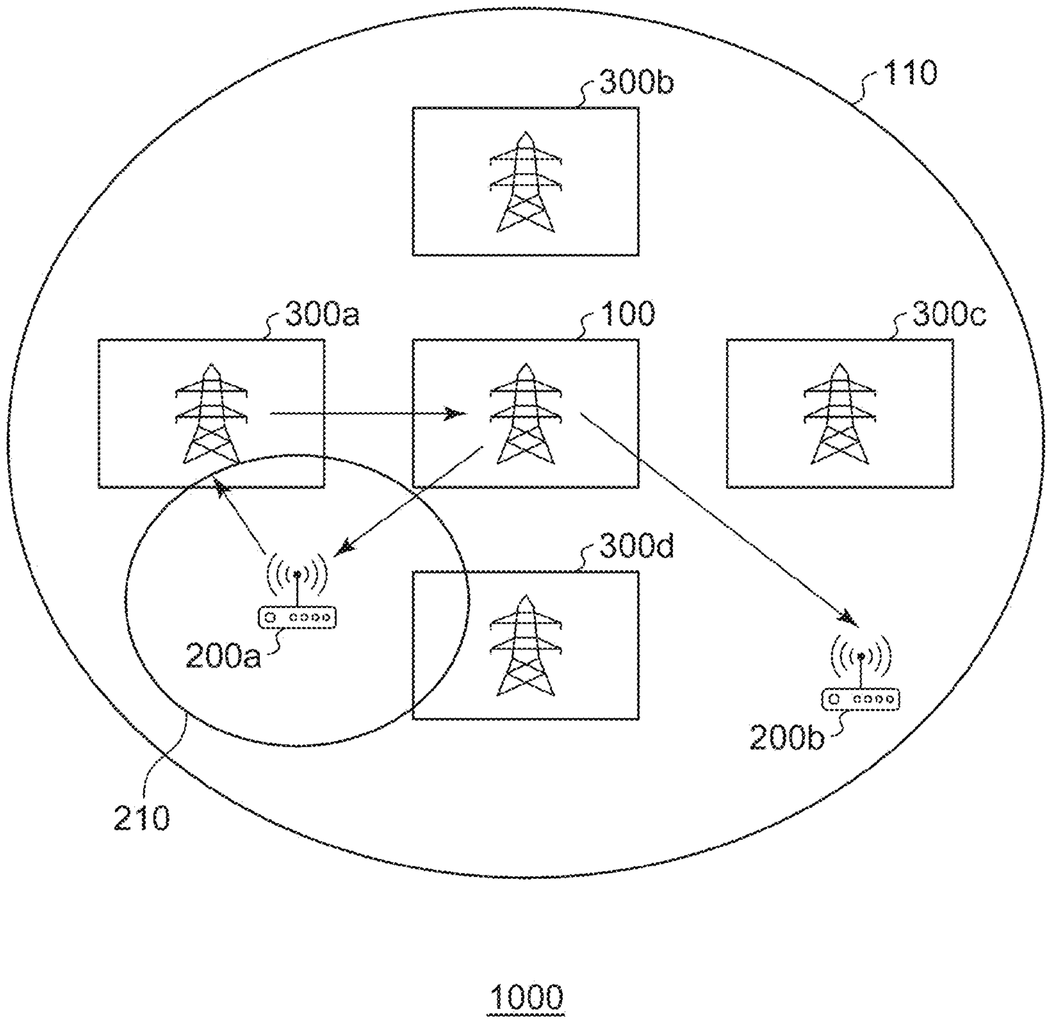
FIG. 8 is a diagram showing another configuration of the wireless communication system of FIG. 1.

FIG. 8 shows another configuration of the wireless communication system 1000. This indicates a situation where the first mobile station 200*a* and the second mobile station 200*b* become connected to the host relay station 100 following the first mobile station 200*a*, thereby causing the first mobile station 200*a* and the second mobile station 200*b* to communicate via the host relay station 100. The control unit 150 of the host relay station 100 includes slot information in the audio frame received from the first mobile station 200*a*. FIG. 9 shows a data structure of slot information included in an audio or data frame. Although the slot information is shown in the same manner as in FIG. 6, "Voice or Data" is stored in the slot A. This is equivalent to being in use. Further, the slot information indicates that the slot B is unused. Such slot information indicates that the first downlink time slot and the first uplink time slot are in use after the communication with the first mobile station 200*a* is started and that the second downlink time slot and the second uplink time slot are unused. The description now returns to FIG. 8. The transmission unit 120 of the host relay station 100 transmits an audio frame at the downlink frequency in the second downlink time slot that is not allocated to the first mobile station 200*a*.

The reception unit 230 of the second mobile station 200*b* receives the audio frame at the downlink frequency. The control unit 250 extracts slot information from the audio frame. The control unit 250 recognizes that the slot B is available based on the slot information. The control unit 250 reproduces the received audio frame. On the other hand, when transmitting an audio frame from the second mobile station 200*b*, the transmission unit 220 transmits the audio frame to the host relay station 100 at the uplink frequency in the second uplink time slot.

The reception unit 130 of the host relay station 100 receives the audio frame from the second mobile station 200*b* in the second uplink time slot at the uplink frequency. The control unit 150 uses the second downlink time slot and the second uplink time slot, that is, the slot A, for the second mobile station 200*b*. The first mobile station 200*a* uses the slot A while the second mobile station 200*b* uses the slot B, thereby causing the first mobile station 200*a* and the second mobile station 200*b* to communicate via the host relay station 100.

(2-2) Process when Subordinate Relay Station 300 is Also Included

Next, as shown in FIG. 1, it is assumed that the mobile station transmission coverage 210 of the first mobile station 200*a* does not include the host relay station 100 but includes the first subordinate relay station 300*a*. As described above, when transmission is being suspended by the host relay station 100, the mobile station 200 that wishes to start communication, which is the first mobile station 200*a*, transmits a transmission start request at the uplink frequency.

The reception unit 330 of the first subordinate relay station 300*a* receives a transmission start request from the first mobile station 200*a* at the uplink frequency when the host relay station 100 is suspending the transmission. The network communication unit 340 transmits a transmission start request to the host relay station 100 by a wired network. The network communication unit 340 of the host relay station 100 receives the transmission start request from the first subordinate relay station 300*a*. Upon receiving the transmission start request, the control unit 150 generates an idle frame including slot information, and the transmission unit 120 transmits the idle frame at the downlink frequency. Since the idle frame and slot information are the same as before, the explanation is omitted here.

The reception unit 230 of the first mobile station 200*a* receives the idle frame. The control unit 250 establishes synchronization with the host relay station 100 based on the time of the reception of the idle frame. Based on the slot information extracted from the idle frame, the control unit 250 selects any one of the slots, for example, the slot A. The control unit 250 includes the selected slot number in a signal to be transmitted, for example, an audio frame. The transmission unit 220 transmits the audio frame in the slot A, that is, the first uplink time slot. The signal to be transmitted is not limited to an audio frame and may be a data frame.

The reception unit 330 of the first subordinate relay station 300*a* receives an audio frame from the first mobile station 200*a* in the first uplink time slot at the uplink frequency. The network communication unit 340 transmits an audio frame to the host relay station 100 by a wired network. The network communication unit 340 of the host relay station 100 receives the audio frame from the first subordinate relay station 300*a*. The control unit 150 permits the first mobile station 200*a* to use the slot A based on the slot number included in the audio frame. Further, the control unit 150 determines the uplink time slot including the point in time at which the audio frame has been received by the network communication unit 340 to be the first uplink time slot. As a result, the control unit 150 allocates the first uplink time slot and the first downlink time slot to the first mobile station 200*a*.

Since the subsequent processes in FIG. 8 are the same as before, the explanation thereof is omitted. As a result of such processes, the host relay station 100 transmits the audio frame to the first mobile station 200*a* using the first downlink time slot at the downlink frequency. Further, the first mobile station 200*a* transmits the audio frame to the first subordinate relay station 300*a* using the first uplink time slot at the uplink frequency, and the first subordinate relay station 300*a* transmits the audio frame received from the first mobile station 200*a* to the host relay station 100.

FIGS. 10A to 10H show an overview of another communication when the idle frame of FIG. 6 is used. FIGS. 10A to 10C are identical to FIGS. 7A to 7C. FIG. 10D shows a signal received by the first subordinate relay station 300*a*. The first subordinate relay station 300*a* receives a signal from the first mobile station 200*a*. FIG. 10E shows a signal transmitted from the first subordinate relay station 300*a* via a communication network. A signal received from the first mobile station 200*a* is transmitted. FIG. 10F shows a signal received via a communication network at the host relay station 100. A signal from the first subordinate relay station 300*a* is received.

FIG. 10G shows an uplink time slot determined by the host relay station 100. Since a slot number included in the signal from the first mobile station 200*a* includes the slot A, the uplink time slot including the time at which the signal has been received is determined to be the first uplink time slot. The first uplink time slot is shown as "slot A" here. Further, the host relay station 100 arranges the first uplink time slot and the second uplink time slot alternately based on the determined first uplink time slot. FIG. 10H shows a downlink time slot determined by the host relay station 100. The host relay station 100 determines a downlink time slot with the same point in time as the first uplink time slot to be the second downlink time slot. The host relay station 100 determines a downlink time slot with the same point in time as the second uplink time slot to be the first downlink time slot.

(2-3) Problems

In (2-2), indefinite network delay may occur between the first subordinate relay station 300*a* and the host relay station 100. As described above, since the host relay station 100 determines the uplink time slot including the time at which the audio frame has been received to be the first uplink time slot, there is a possibility that the first uplink time slot determined by the host relay station 100 and the first uplink time slot specified in the first mobile station 200*a* may differ from each other. This corresponds to the fact that the first downlink time slot determined by the host relay station 100 and the first downlink time slot specified in the first mobile station 200*a* are different and the fact that the slot A determined by the host relay station 100 and the slot A specified in the first mobile station 200*a* are different.

Figures 11A, 11B, 11C, 11D, 11E, 11F, 11G, 11H:
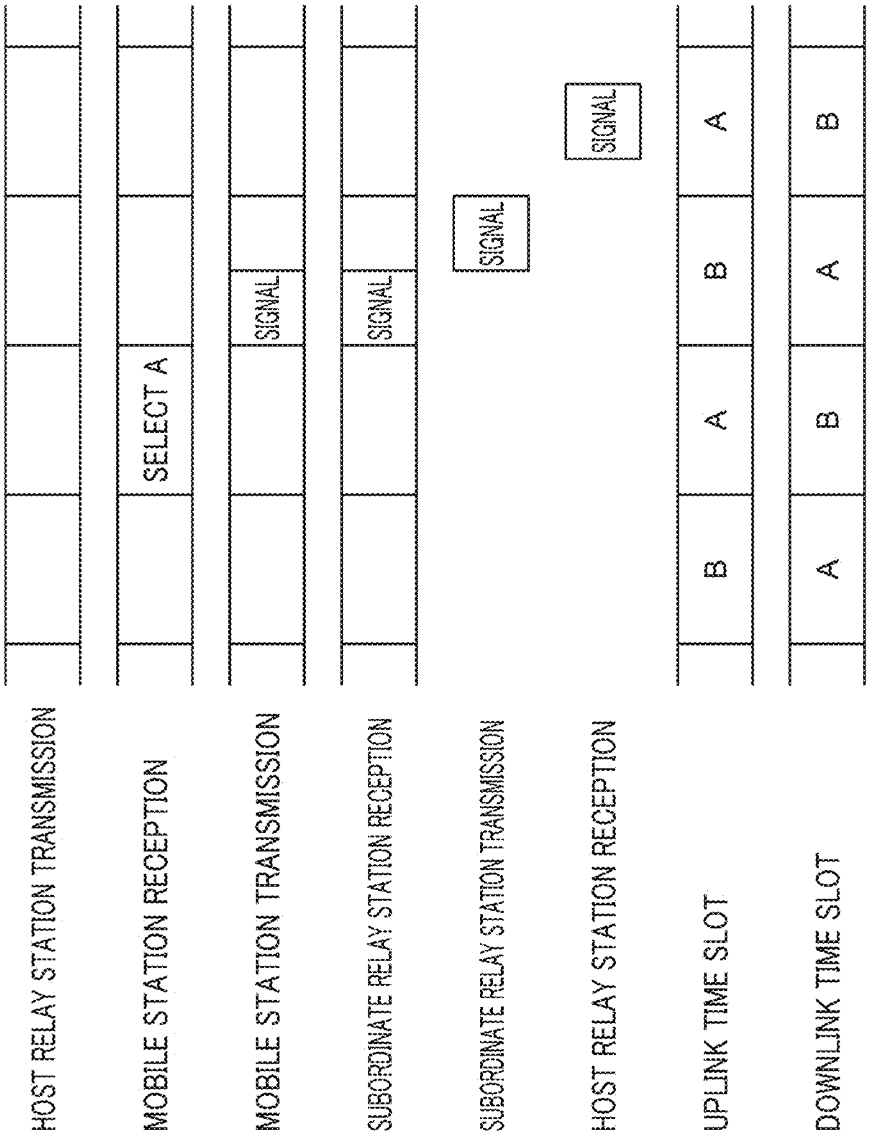
FIGS. 11A to 11H are diagrams showing an overview of communication in a situation where a problem occurs when the idle frame of FIG. 6 is used.

FIGS. 11A to 11H show an overview of communication in a situation where a problem occurs when the idle frame of FIG. 6 is used. FIGS. 11A to 11E are identical to FIGS. 10A to 10E. FIG. 11F shows a signal received via the communication network at the host relay station 100. A signal from the first subordinate relay station 300*a* is received due to network delay.

FIG. 11G shows an uplink time slot determined by the host relay station 100. Since a slot number included in the signal from the first mobile station 200*a* includes the slot A, the uplink time slot including the time at which the signal has been received is determined to be the first uplink time slot. The first uplink time slot is shown as "slot A" here. Further, the host relay station 100 arranges the first uplink time slot and the second uplink time slot alternately based on the determined first uplink time slot. FIG. 11H shows a downlink time slot determined by the host relay station 100. The host relay station 100 determines a downlink time slot with the same point in time as the first uplink time slot to be the second downlink time slot. The host relay station 100 determines a downlink time slot with the same point in time as the second uplink time slot to be the first downlink time slot.

The first mobile station 200*a* recognizes the downlink time slot indicated as "A selection" in FIG. 11B as the first downlink time slot. On the other hand, according to FIG. 11H, the first downlink time slot in the host relay station 100 is different from the first downlink time slot recognized in the first mobile station 200*a*. Further, the first mobile station 200*a* recognizes the uplink time slot in which the signal has been transmitted in FIG. 11C as the first uplink time slot. On the other hand, according to FIG. 11G, the first uplink time slot in the host relay station 100 is different from the first uplink time slot recognized in the first mobile station 200*a*.

As a result, a slot A in the first mobile station 200*a* differs from a slot A in the host relay station 100. The host relay station 100 uses a slot B for communication with the second mobile station 200*b*. However, a slot B allowed to be used in the second mobile station 200*b* by the host relay station 100 is the slot A in the first mobile station 200*a*. As a result, transmission by the second mobile station 200*b* interferes with the transmission of the first mobile station 200*a*.

(3) Connection Process in Present Exemplary Embodiment

In order to share common recognition of slots between the host relay station 100 and the first mobile station 200_a_ even in a situation where network delay occurs, the host relay station 100 according to the present exemplary embodiment performs the following process. The control unit 150 of the host relay station 100 sets slots A and slots B for a plurality of downlink time slots and a plurality of uplink time slots even when communication with the mobile station 200 is not performed.

Further, upon receiving a transmission start request from the subordinate relay station 300, the control unit 150 generates an idle frame including slot information indicating that either one of a slot A or a slot B is in use even though both of the slots A and B are unused. FIG. 12 shows a data structure of slot information included in an idle frame according to the present exemplary embodiment. The slot A is considered to be unused and the slot B is considered to be in use in the figure. In other words, although the slot B is unused, the control unit 150 regards the slot B as being in use. This corresponds to indicating that downlink time slots other than the first downlink time slot are in use out of the plurality of downlink time slots and that uplink time slots other than the first uplink time slot are in use out of the plurality of uplink time slots. With such slot information, the host relay station 100 instructs the first mobile station 200_a_ to use the slot A. The description now returns to FIG. 8. The transmission unit 120 transmits the idle frame at the downlink frequency.

The reception unit 230 of the first mobile station 200_a_ receives the idle frame. The control unit 250 establishes synchronization with the host relay station 100 based on the time of the reception of the idle frame. As a result, the slots A and B preset in the host relay station 100 and the slots A and B recognized in the first mobile station 200_a_ are common. The control unit 250 extracts slot information from the idle frame. As described above, since the slot B is in use according to the slot information, the control unit 250 selects an unused slot A. The transmission unit 220 transmits the audio frame in the slot A, that is, the first uplink time slot. The signal to be transmitted is not limited to an audio frame and may be a data frame. The audio frame or the data frame does not need to include the selected slot number.

The reception unit 330 of the first subordinate relay station 300_a_ receives an audio frame from the first mobile station 200_a_ in the first uplink time slot at the uplink frequency. The network communication unit 340 transmits an audio frame to the host relay station 100 by a wired network. The network communication unit 140 of the host relay station 100 receives the audio frame from the first subordinate relay station 300_a_. The control unit 150 allows the first mobile station 200_a_ to use the slot A designated in advance for the first mobile station 200_a_. The slot A is preset in this case. Therefore, the slot A used for the first mobile station 200_a_ does not change even if network delay occurs. The host relay station 100 uses the first downlink time slot and the first uplink time slot for the first mobile station 200_a_. Since the subsequent processes in FIG. 8 are the same as before, the explanation thereof is omitted.

Figure 13:
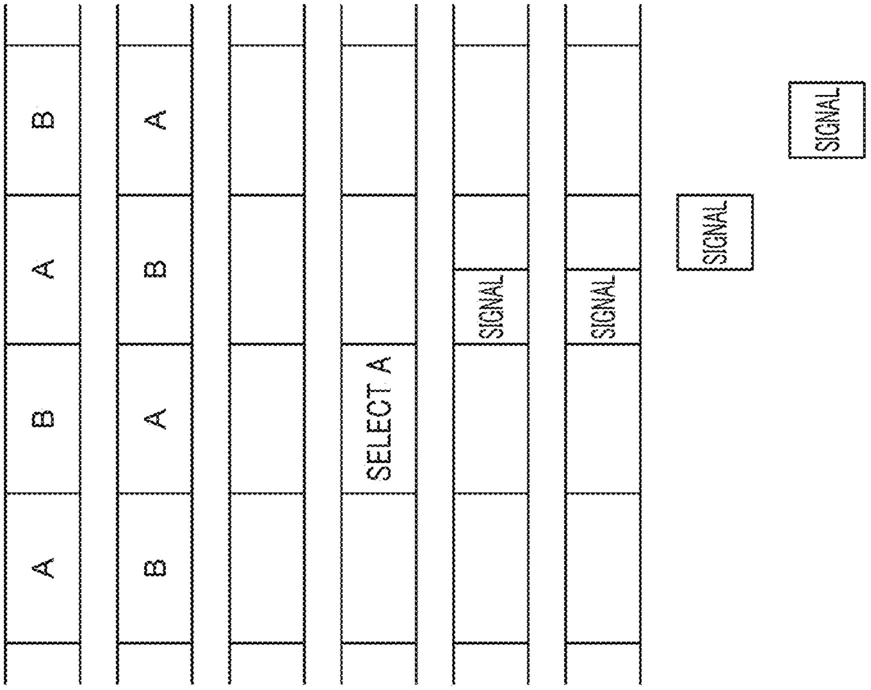
FIGS. 13A to 13H are diagrams showing an overview of communication when the idle frame of FIG. 12 is used.

FIGS. 13A to 13H show an overview of communication when the idle frame of FIG. 12 is used. FIG. 13A shows uplink time slots determined by the host relay station 100. The first and second uplink time slots are alternately arranged. FIG. 13B shows downlink time slots determined by the host relay station 100. The first and second downlink time slots are alternately arranged. FIGS. 13C to 13H are identical to FIGS. 11A to 11F. In FIG. 13H, the host relay station 100 allows the first mobile station 200_a_ to use the preset slot A regardless of the point in time at which the first mobile station 200 receives a signal.

The configuration is implemented in hardware by any CPU of a computer, memory or other LSI's, and in software by a program or the like loaded into the memory. The figure depicts functional blocks implemented by the cooperation of hardware and software. Thus, a person skilled in the art should appreciate that there are many ways of accomplishing these functional blocks in various forms in accordance with the components of hardware only, software only, or the combination of both.

Figure 14:
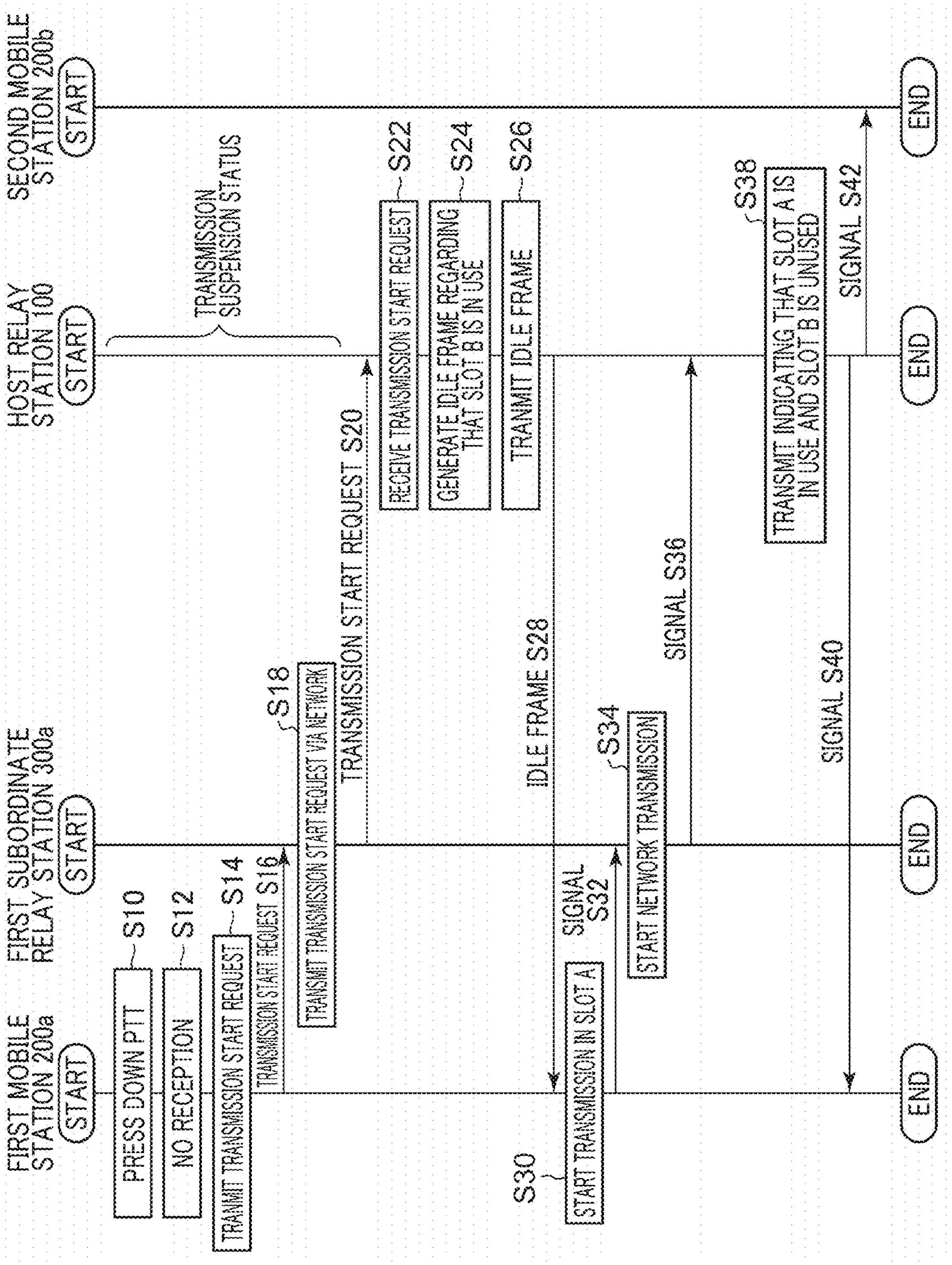
FIG. 14 is a sequence diagram showing a communication procedure in a communication system shown in FIG. 1.

An explanation will be given of the operation of the wireless communication system 1000 having the above-stated structure. FIG. 14 is a sequence diagram showing steps of communication by the wireless communication system 1000. A PTT button of the first mobile station 200_a_ is pressed down (S10). The first mobile station 200_a_ confirms that the first mobile station 200_a_ is not receiving a signal from the host relay station 100 (S12). The first mobile station 200_a_ transmits a transmission start request (S14 and S16). The first subordinate relay station 300_a_ transmits the transmission start request via a network (S18 and S20). The host relay station 100 receives the transmission start request (S22). The host relay station 100 generates an idle frame while regarding that the slot B to be in use (S24), and transmits the idle frame (S26 and S28). The first mobile station 200_a_ starts transmitting a signal in the slot A (S30 and S32). The first subordinate relay station 300_a_ starts transmitting a signal via a network (S34 and S36). The host relay station 100 transmits a signal indicating that the slot A is in use and the slot B is unused (S38, S40, and S42).

According to the present exemplary embodiment, since an idle frame including slot information indicating that all but one slot are in use is transmitted, the mobile station can be instructed to use the one slot. Further, since the mobile station transmits a signal using the indicated slot, the host mobile station can determine that the signal has been received at the slot as instructed in advance even if network delay occurs. Further, since the recognition regarding slots is common between the mobile station and the host relay station, communication between the host relay station and the mobile station can be accurately performed. Also, since the recognition regarding slots is common between the mobile station and the host relay station, the allocation of time slots can be accurately performed even when network delay may occur. In addition, since the communication between the host relay station and the mobile station is accurately performed, another mobile station can also communicate with the host relay station using another slot.

Described above is an explanation on the present disclosure based on the exemplary embodiments. These exemplary embodiments are intended to be illustrative only, and it will be obvious to those skilled in the art that various modifications to constituting elements and processes could be developed and that such modifications are also within the scope of the present disclosure.

What is claimed is:

1. A wireless communication system comprising:

a host relay station that is capable of specifying a plurality of downlink time slots time-division multiplexed at a downlink frequency, specifying a plurality of uplink time slots time-division multiplexed at an uplink frequency different from the downlink frequency, transmitting a signal at the downlink frequency, and receiving a signal at the uplink frequency; and a subordinate relay station that is connected to the host relay station via a network and is capable of receiving a signal at the uplink frequency but is not capable of transmitting a signal at the downlink frequency, wherein the host relay station suspends transmission of a signal when there is no signal reception, wherein upon receiving a transmission start request at the uplink frequency from a mobile station that wishes to start communication when the transmission is being suspended by the host relay station, the subordinate relay station transmits the transmission start request to the host relay station via the network, wherein upon receiving the transmission start request from the subordinate relay station, the host relay station transmits an idle frame at the downlink frequency that indicates that downlink time slots other than a first downlink time slot are in use out of the plurality of downlink time slots and that uplink time slots other than a first uplink time slot are in use out of the plurality of uplink time slots, wherein upon receiving a signal from the mobile station in the first uplink time slot at the uplink frequency, the subordinate relay station transmits the signal to the host relay station via the network, wherein the host relay station receives the signal from the subordinate relay station, and wherein the host relay station uses the first downlink time slot and the first uplink time slot for the mobile station.

2. The wireless communication system according to claim 1, wherein the plurality of downlink time slots include the first downlink time slot and a second downlink time slot, wherein the plurality of uplink time slots include the first uplink time slot and a second uplink time slot, wherein the host relay station transmits information indicating that the first downlink time slot and the first uplink time slot are in use after the communication with the first mobile station is started and that the second downlink time slot and the second uplink time slot are unused, and wherein given that the mobile station is referred to as a first mobile station, a second mobile station different from the first mobile station performs communication using the second downlink time slot and the second uplink time slot based on the information.

* * * * *